(12) United States Patent
Liu

(10) Patent No.: US 12,395,969 B2
(45) Date of Patent: Aug. 19, 2025

(54) RESOURCE CONFIGURATION METHOD, APPARATUS, AND DEVICE

(71) Applicant: VIVO MOBILE COMMUNICATION CO., LTD., Guangdong (CN)

(72) Inventor: Jinhua Liu, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 495 days.

(21) Appl. No.: 17/847,140

(22) Filed: Jun. 22, 2022

(65) Prior Publication Data

US 2022/0322320 A1    Oct. 6, 2022

Related U.S. Application Data

(63) Continuation of application No. PCT/CN2021/073101, filed on Jan. 21, 2021.

(30) Foreign Application Priority Data

Jan. 23, 2020    (CN) .......................... 202010076411.4

(51) Int. Cl.
  *H04W 72/044*    (2023.01)
  *H04W 72/29*    (2023.01)

(52) U.S. Cl.
  CPC ......... *H04W 72/044* (2013.01); *H04W 72/29* (2023.01)

(58) Field of Classification Search
  CPC ..... H04W 24/02; H04W 72/29; H04W 28/16; H04W 72/044; H04W 88/04; H04B 7/15542

(Continued)

(56) References Cited

U.S. PATENT DOCUMENTS

2019/0319774 A1    10/2019    Luo et al.
2019/0373627 A1    12/2019    Luo et al.
(Continued)

FOREIGN PATENT DOCUMENTS

CN    110351836 A    10/2019
CN    110536352 A    12/2019
(Continued)

OTHER PUBLICATIONS

Huawei et al., "Physical layer design for NR IAB," 3GPP TSG RAN WG1 Meeting #95, R1-1812198, pp. 1-15, (Nov. 12-16, 2018).
(Continued)

*Primary Examiner* — Mang Hang Yeung
(74) *Attorney, Agent, or Firm* — BROOKS KUSHMAN P.C.

(57) ABSTRACT

Embodiments of this application provide a resource configuration method, apparatus, and device, and pertain to the field of communications technologies. The method is applied to a centralized unit CU, where the CU communicates with a first IAB node and a second IAB node, the first IAB node and the second IAB node schedule data transmission over a first hop and a second hop of the first IAB node, respectively, and the method includes: determining a multiplexing pattern between the first hop and the second hop; and sending multiplexing resource configuration information for the first hop and/or the second hop, where the multiplexing resource configuration information is used to indicate a resource configuration for the multiplexing pattern.

20 Claims, 5 Drawing Sheets

Receive multiplexing resource configuration information sent by a CU  S401

Schedule data transmission over a hop of an IAB node according to a resource configuration characterized in the multiplexing resource configuration information   S402

(58) Field of Classification Search
USPC .......................................................... 370/329
See application file for complete search history.

(56) References Cited

U.S. PATENT DOCUMENTS

| | | |
|---|---|---|
| 2019/0394687 A1 | 12/2019 | Kowalski et al. |
| 2020/0146025 A1* | 5/2020 | Choi .................... H04W 88/14 |
| 2021/0022136 A1 | 1/2021 | Kimba Dit Adamou et al. |
| 2021/0127389 A1 | 4/2021 | Liu et al. |
| 2021/0235428 A1 | 7/2021 | Zhang et al. |
| 2022/0015093 A1* | 1/2022 | Ying .................. H04B 7/15542 |

FOREIGN PATENT DOCUMENTS

| | | |
|---|---|---|
| CN | 110536466 A | 12/2019 |
| CN | 110691416 A | 1/2020 |
| WO | 2019/206171 A1 | 10/2019 |
| WO | 2020007244 A1 | 1/2020 |

OTHER PUBLICATIONS

Extended European Search Report dated Jun. 5, 2023 as received in Application No. 21744689.7.
CN Office Action in Application No. 202010076411.4 Dated Jul. 4, 2022.
IN Office Action in Application No. 202227035298 Dated Oct. 17, 2022.
"On resource coordination and dynamic scheduling in IAB" 3GPP TSG RAN WG1 Meeting #95, Huawei, HiSilicon, R1-1812201, Nov. 12, 2018.
"Remaining issues on IAB resource configuration and multiplexing" 3GPP TSG-RAN WG1 Meeting #99, Ericsson, R1-1912133, Nov. 18, 2019.
"IAB node resource allocation signalling and configuration" 3GPP TSG RAN WG3 #106, AT&T, R3-197451, Nov. 18, 2019.
"Rel-17 IAB email discussion—report" 3GPP TSG RAN meeting #86, Qualcomm Incorporated (Mediator), RP-193094, Dec. 9, 2019.
Written Opinion and International Search Report in Application No. PCT/CN2021/073101 Dated Jan. 23, 2020.
Qualcomm Incorporated. IAB Resource Management. 3GPP TSG RAN WG1 Meeting #94. R1-1809444. Online. Aug. 2018. 6 pages.
Second European Office Action for Application No. 21744689.7 mailed Apr. 28, 2025. 11 pages.

* cited by examiner

| First hop | HARD UL | HARD UL | HARD UL | NA | NA | HARD DL | HARD DL | HARD DL | flexible | flexible |
|---|---|---|---|---|---|---|---|---|---|---|
| | 0 | 1 | 2 | 3 | 4 | 5 | 6 | 7 | 8 | 9 |
| Second hop | HARD UL | HARD DL | NA | HARD UL | HARD DL | NA | HARD UL | HARD DL | flexible | flexible |
| | 0 | 1 | 2 | 3 | 4 | 5 | 6 | 7 | 8 | 9 |
| | MPTR UL | SDM RX | | | | | SDM TX | MPTR DL | | |
FIG. 9
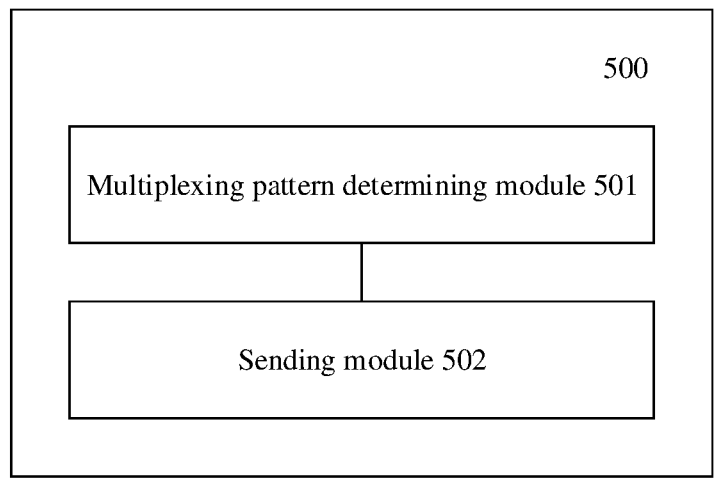
FIG. 10
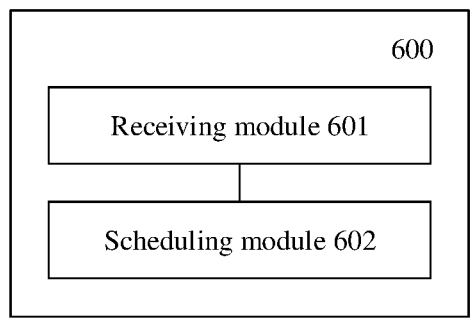
FIG. 11

RESOURCE CONFIGURATION METHOD, APPARATUS, AND DEVICE

CROSS-REFERENCE TO RELATED APPLICATIONS

This application is a continuation application of PCT International Application No. PCT/CN2021/073101 filed on Jan. 21, 2021, which claims a priority to Chinese patent application No. 202010076411.4, filed on Jan. 23, 2020 and entitled "RESOURCE CONFIGURATION METHOD, APPARATUS, AND DEVICE", which is incorporated herein by reference in its entirety.

TECHNICAL FIELD

This application relates to the communications field, and in particular, to a resource configuration method, apparatus, and device.

BACKGROUND

An integrated access backhaul (IAB) node includes a distributed unit (DU) and a mobile termination (MT) unit. With its MT, one IAB node may establish a wireless connection to a DU of one parent IAB node, thereby establishing a backhaul link between IAB nodes.

With development and evolution of IAB technologies, IAB nodes are required to support across-hop transmission. For ease of description, across-hop is referred to as hop below. A hop between an IAB node and a child IAB node of the IAB node, namely, hop A, is scheduled by the IAB node. A hop between an IAB node and a parent IAB node of the IAB node, namely, hop B, is scheduled by the parent IAB node. To avoid excessive conflict between data transmission over hop A scheduled by the IAB node and data transmission over hop B scheduled by the parent IAB node, hop A and hop B are conservatively scheduled, causing low spectrum efficiency of a network of the IAB nodes.

SUMMARY

According to a first aspect, an embodiment of this application provides a resource configuration method, applied to a centralized unit CU, where the CU communicates with a first IAB node and a second IAB node, the first IAB node and the second IAB node schedule data transmission over a first hop and a second hop of the first IAB node, respectively, and the method includes:
  determining a multiplexing pattern between the first hop and the second hop; and
  sending multiplexing resource configuration information for the first hop and/or the second hop, where the multiplexing resource configuration information is used to indicate a resource configuration for the multiplexing pattern.

According to a second aspect, an embodiment of this application provides a resource configuration method, applied to an IAB node, where the IAB node communicates with a centralized unit CU, and the method includes:
  receiving multiplexing resource configuration information sent by the CU, where the multiplexing resource configuration information is used to indicate a resource configuration for a multiplexing pattern between a hop scheduled by the IAB node and a hop scheduled by another IAB node; and
  scheduling data transmission over the hop of the IAB node according to the resource configuration indicated by the multiplexing resource configuration information, where
  the IAB node is a child IAB node or a parent IAB node of the another IAB node.

According to a third aspect, an embodiment of this application provides a resource configuration apparatus, where the resource configuration apparatus communicates with a first IAB node and a second IAB node, the first IAB node and the second IAB node schedule data transmission over a first hop and a second hop of the first IAB node, respectively, and the resource configuration apparatus includes:
  a multiplexing pattern determining module, configured to determine a multiplexing pattern between the first hop and the second hop; and
  a sending module, configured to send multiplexing resource configuration information for the first hop and/or the second hop, where the multiplexing resource configuration information is used to indicate a resource configuration for the multiplexing pattern.

According to a fourth aspect, an embodiment of this application provides a resource configuration apparatus, where the resource configuration apparatus communicates with a centralized unit CU, and the resource configuration apparatus includes:
  a receiving module, configured to receive multiplexing resource configuration information sent by the CU, where the multiplexing resource configuration information is used to indicate a resource configuration for a multiplexing pattern between a hop scheduled by the resource configuration apparatus and a hop scheduled by another resource configuration apparatus; and
  a scheduling module, configured to schedule data transmission over the hop of the resource configuration apparatus according to the resource configuration indicated by the multiplexing resource configuration information, where
  the resource configuration apparatus is a child resource configuration apparatus or a parent resource configuration apparatus of the another resource configuration apparatus.

According to a fifth aspect, an embodiment of this application provides a resource configuration device, including a processor, a memory, and a computer program stored in the memory and capable of running on the processor, where when the computer program is executed by the processor, the resource configuration method in the technical solution according to the first aspect or the resource configuration method in the technical solution according to the second aspect is implemented.

According to a sixth aspect, an embodiment of this application provides a computer-readable storage medium, where the computer-readable storage medium stores a computer program, and when the computer program is executed by a processor, the resource configuration method in the technical solution according to the first aspect or the resource configuration method in the technical solution according to the second aspect is implemented.

BRIEF DESCRIPTION OF DRAWINGS

To facilitate better understanding of this application, the following describes embodiments of this application with reference to accompanying drawings. Same or similar reference signs represent same or similar features.

FIG. 9 is a schematic diagram of an example of a resource pattern for a hop according to an embodiment of this application;

FIG. 10 is a schematic structural diagram of an embodiment of a resource configuration apparatus according to this application;

FIG. 11 is a schematic structural diagram of an embodiment of a resource configuration apparatus according to this application;

DESCRIPTION OF EMBODIMENTS

The following clearly escribes the technical solutions in the embodiments of this application with reference to the accompanying drawings in the embodiments of this application. Apparently, the described embodiments are some rather than all of the embodiments of this application. All other embodiments obtained by a person of ordinary skill in the art based on the embodiments of this application without creative efforts fall within the protection scope of this application.

Figure 1:
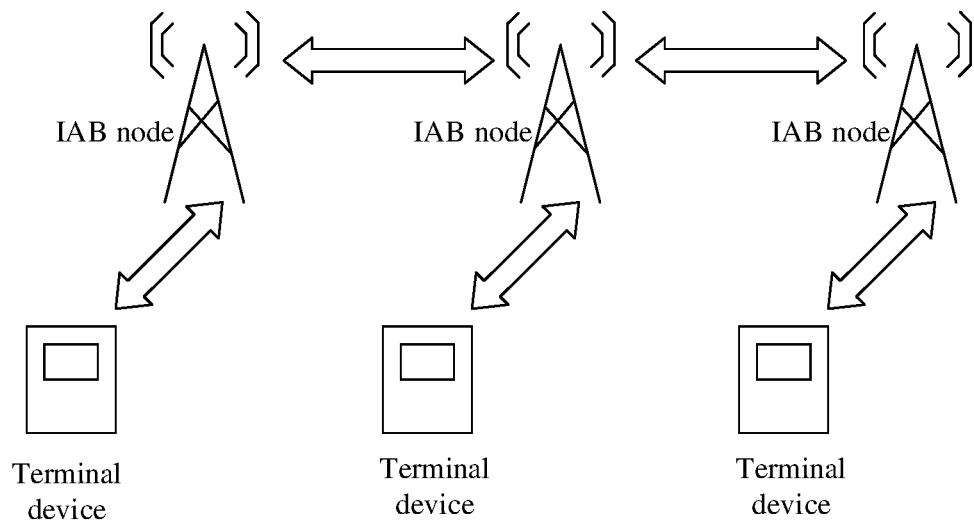
FIG. 1 is a schematic structural diagram of an embodiment of an IAB system according to this application.

The embodiments of this application provide a resource configuration method, apparatus, and device, which is applicable to an integrated access backhaul (IAB) system. In a case that a wired transmission network cannot be deployed, an IAB node in the IAB system can depend on wireless backhaul to implement information transmission. FIG. 1 is a schematic structural diagram of an embodiment of an IAB system according to this application. As shown in FIG. 1, the IAB system includes a plurality of IAB nodes and a plurality of terminal devices. Each IAB node can access one or more terminal devices, which is not limited herein. The IAB node may correspond to a parent IAB node, and the IAB node may correspond to a child IAB node. In three IAB nodes shown in FIG. 1, a second IAB node is a parent node of a first IAB node, and a third IAB node is a parent node of the second IAB node. There is across-hop (across hop) transmission between the IAB node and a downstream node of the IAB node, and there is across-hop transmission between the IAB node and a parent IAB node of the IAB node. For ease of description, the "across-hop transmission" is referred to as "hop" below. The downstream node of the IAB node may include the child IAB node of the IAB node or a terminal device. The IAB node may schedule a hop between the IAB node and the downstream node of the IAB node, and the parent IAB node of the IAB node may schedule a hop between the IAB node and the parent IAB node of the IAB node. The IAB node may be specifically implemented as a base station, which is not limited herein. The terminal device may be implemented as a mobile phone, a computer, a tablet computer, and another communications device, which is not limited herein.

Figure 2:
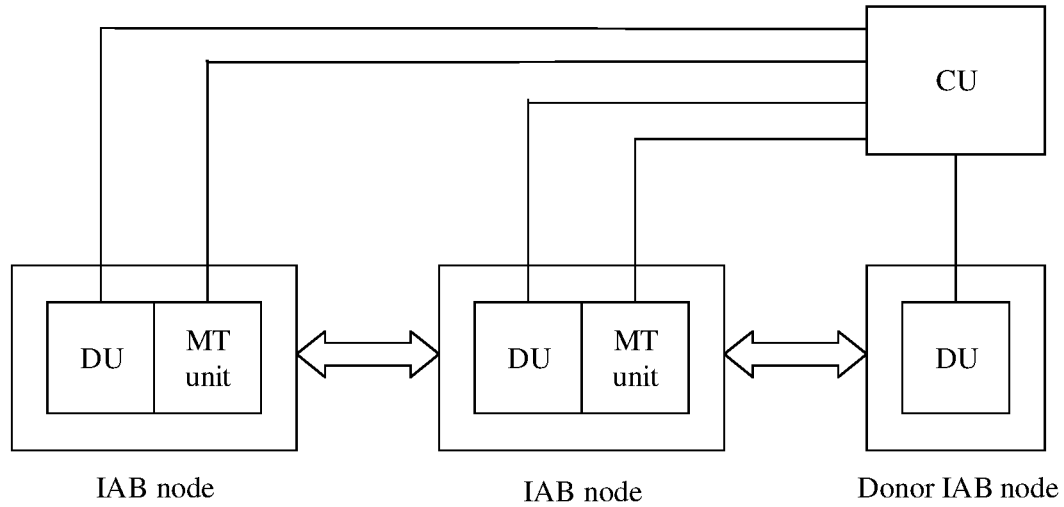
FIG. 2 is a schematic diagram of example communication of an IAB node and a centralized unit according to an embodiment of this application.

The IAB node includes a distributed unit DU) and a mobile termination (MT) unit. With its MT unit, one IAB node may establish a wireless connection to a DU of one parent IAB node, thereby establishing a backhaul link between IAB nodes. It should be noted that one integrated access backhaul loop includes a donor IAB node. The donor IAB node includes no MT unit. FIG. 2 is a schematic diagram of example communication of an IAB node and a centralized unit (CU) according to an embodiment of this application. As shown in FIG. 2, in the integrated access backhaul loop, DUs of all IAB nodes are connected to one CU, and the CU configures the DU. MT units of all IAB nodes are connected to the CU, and the CU configures the MT unit. The CU may be specifically implemented as a base station, which is not limited herein.

Figure 3:
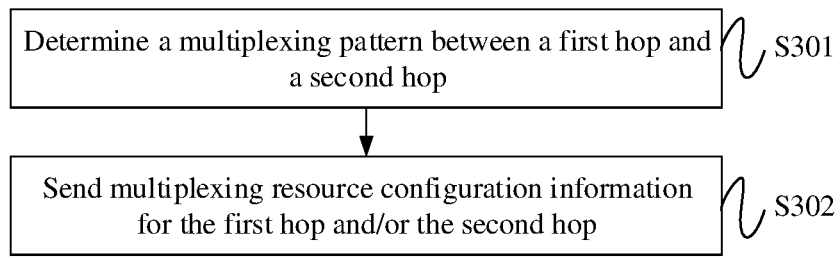
FIG. 3 is a flowchart of an embodiment of a resource configuration method applied to a centralized unit according to this application.

An embodiment of this application provides a resource configuration method, which is applied to the CU. The CU communicates with the first IAB node and the second IAB node. The first IAB node and the second IAB node respectively schedule a first hop and a second hop of the first IAB node. Specifically, the second IAB node is the parent node of the first IAB node. That is, the first IAB node is a child IAB node of the second IAB node. The first hop may be a hop between the first IAB node and the downstream node of the first IAB node, and the first IAB node schedules data transmission over the first hop. The second hop may be a hop between the first IAB node and the second IAB node, and the second IAB node schedules data transmission over the second hop. FIG. 3 is a flowchart of an embodiment of a resource configuration method applied to a centralized unit according to this application. As shown in FIG. 3, the resource configuration method may include step S301 and step S303.

Step S301: Determine a multiplexing pattern between a first hop and a second hop.

The first IAB node participates in not only data transmission over the first hop, but also data transmission over the second hop. The CU may predetermine the multiplexing pattern between the first hop and the second hop, so that data transmission of the first IAB node over the first hop and data transmission of the first IAB node over the second hop are performed in the multiplexing pattern, thereby improving spectrum efficiency of a network of the IAB node.

Specifically, the CU may determine the multiplexing pattern between the first hop and the second hop based on a data transmission and reception capability of the first IAB node and/or a data transmission capability of the second IAB node. A specific manner in which the CU determines the multiplexing pattern between the first hop and the second hop is not limited herein.

Step S302: Send multiplexing resource configuration information for the first hop and/or the second hop.

The CU may send the multiplexing resource configuration information for the first hop. The CU may send the multiplexing resource configuration information for the second hop. The CU may alternatively send the multiplexing resource configuration information for the first hop and the multiplexing resource configuration information for the second hop. The multiplexing resource configuration information is used to indicate a resource configuration for a multiplexing pattern in the foregoing step, so that an IAB node that receives the multiplexing resource configuration information performs resource configuration based on the multiplexing resource configuration information.

Specifically, the CU may determine the multiplexing resource configuration information for the first hop and/or the multiplexing resource configuration information for the second hop based on the data transmission and reception capability of the first IAB node and/or the data transmission capability of the second IAB node. A specific manner in which the CU determines the multiplexing resource configuration information of the first IAB node and the multiplexing resource configuration information of the second IAB node is not limited herein.

Further, the CU sends the multiplexing resource configuration information for the first hop to the first IAB node, so that the first IAB node schedules data transmission over the first hop by using the multiplexing resource configuration information for the first hop; and/or the CU sends the multiplexing resource configuration information for the second hop to the second IAB node, so that the second IAB node schedules data transmission over the second hop by using the multiplexing resource configuration information for the second hop.

In this embodiment of this application, the CU determines the multiplexing pattern for the first hop and the second hop of the first IAB node, and sends the multiplexing resource configuration information for the first hop and/or the second hop. Herein, the multiplexing resource configuration information may indicate a resource configuration for the multiplexing pattern. The sent multiplexing resource configuration information for the first hop and/or the second hop may enable the first IAB node to schedule data transmission over the first hop based on the multiplexing resource configuration information for the first hop, and/or enable the second IAB node to schedule data transmission over the second hop based on the multiplexing resource configuration information for the second hop. Data transmission over the first hop and the second hop is performed in the multiplexing pattern, thereby improving spectrum efficiency of the network of the IAB nodes.

In some examples, the multiplexing resource configuration information may include a time domain resource parameter. The time domain resource parameter may indicate a time domain resource. For example, the time domain resource may include a time period consumed for data transmission over a hop in the time domain. Herein, the time period may include a symbol, a slot, a subframe, a sub-slot, a symbol set, a slot set, a sub-slot set, or the like, which is not limited herein.

The multiplexing resource configuration information may further include one or more of the following: a frequency domain resource parameter, a multiplexing pattern parameter, a power control parameter, a periodicity parameter, and a multiplexing pattern configuration parameter.

The multiplexing pattern parameter may indicate the multiplexing pattern for the first hop and the second hop. For example, the multiplexing pattern may include but is not limited to one or more of the following: space division multiplexing transmission for the first hop and the second hop, space division multiplexing reception for the first hop and the second hop, frequency division multiplexing transmission for the first hop and the second hop, frequency division multiplexing reception for the first hop and the second hop, co-frequency co-time multiplexing for uplink reception over the first hop and uplink transmission over the second hop, co-frequency co-time multiplexing for downlink transmission over the first hop and downlink reception over the second hop, inter-frequency co-time multiplexing for uplink reception over the first hop and uplink transmission over the second hop, and inter-frequency co-time multiplexing for downlink transmission over the first hop and downlink reception over the second hop. Another resource multiplexing pattern such as a co-frequency co-time full-duplex pattern of a single panel also falls within the protection scope of the embodiments of this application. Details are not enumerated herein.

For ease of description, hereinafter, the space division multiplexing transmission for the first hop and the second hop is referred to as a space division multiplexed ransmission pattern (which is an SDM TX pattern), the space division multiplexing reception for the first hop and the second hop is referred to as a space division multiplexed data reception pattern (which is an SDMRX pattern), the frequency division multiplexing transmission for the first hop and the second hop is referred to as a frequency division multiplexed data transmission pattern (which is an FDMTX pattern), frequency division multiplexing reception for the first hop and the second hop is referred to as a frequency division multiplexed data reception pattern (which is an FDM RX pattern), co-frequency co-time multiplexing for uplink reception over the first hop and uplink transmission over the second hop is referred to as a first full-duplex pattern, co-frequency co-time multiplexing for downlink transmission over the first hop and downlink reception over the second hop is referred to as a second full-duplex pattern, inter-frequency co-time multiplexing for uplink reception over the first hop and uplink transmission over the second hop is referred to as a third full-duplex pattern, and inter-frequency co-time multiplexing for downlink transmission over the first hop and downlink reception over the second hop is referred to as a fourth full-duplex pattern.

Space Division Multiplexing (SDM) means that the IAB node simultaneously receives physical downlink shared channel (PDSCH) data from the parent IAB node and physical uplink shared channel (PUSCH) data from the child IAB node or the terminal device on a same time-frequency resource, or means that the IAB node simultaneously sends PUSCH data to the parent IAB node and PDSCH data to the child IAB node or the terminal device on a same time-frequency resource. Herein, a hop between the IAB node and the child IAB node is the first hop, and a hop between the IAB node and the parent IAB node is the second hop.

The SDM TX pattern characterizes that data transmission is simultaneously performed over the first hop and the second hop, that is, the first IAB node sends downlink data over the first hop, and sends uplink data over the second hop; and also characterizes power distribution by the first IAB node between the first hop and the second hop.

The SDMRX pattern characterizes that data reception is simultaneously performed over the first hop and the second hop, that is, the first IAB node receives uplink data over the first hop, and receives downlink data over the second hop.

Frequency Division Multiplexing (FDM) means that the IAB node simultaneously receives PDSCH data from the parent IAB node and PUSCH data from the child IAB node or the terminal device on different frequency resources, or means that the IAB node simultaneously sends PUSCH data to the parent IAB node and PDSCH data to the child IAB node or the terminal device on different frequency resources.

The FDM TX pattern characterizes that data transmission is simultaneously performed over the first hop and the second hop. The first IAB node sends downlink data on some bands over the first hop, and sends uplink data on some other bands over the second hop.

The FDMRX pattern characterizes that data is simultaneously received over the first hop and the second hop. The first IAB node receives uplink data on some bands over the first hop, and receives downlink data on some other bands over the second hop.

Co-frequency co-time duplex (that is, Full Duplex) means that the IAB node simultaneously receives PDSCH data from the parent IAB node and sends PDSCH data to the child IAB node or the terminal device on a same time-frequency resource, or means that the IAB node simultaneously sends PUSCH data to the parent IAB node and receives PUSCH data from the child IAB node or the terminal device on a same time-frequency resource. MPTR is a technology that the IAB node simultaneously sends and receives data separately by using different panels. For example, one IAB node is equipped with two panels. When one panel receives data, the other panel sends data. Panels in the MPTR may be widely spaced apart, which can reduce interference of data transmission to data reception to some extent.

The first full-duplex pattern characterizes that uplink data is received over the first hop and uplink data is transmitted over the second hop on a same time domain resource and a same frequency domain resource. In some examples, the first full-duplex pattern may be implemented through multiple panel transmission reception uplink (MPTR UL).

The second full-duplex pattern characterizes that downlink data is sent over the first hop and downlink data is received over the second hop on a same time domain resource and a same frequency domain resource. In some examples, the second full-duplex pattern may be implemented through multiple panel transmission reception downlink (MPTRDL).

The third full-duplex pattern characterizes that uplink data is received over the first hop and uplink data is transmitted over the second hop on a same time domain resource but on different frequency domain resources. In some examples, the third full-duplex pattern may be implemented through the MPTR UL.

The fourth full-duplex pattern characterizes that downlink data is sent over the first hop and downlink data is received over the second hop on a same time domain resource but different frequency domain resources. In some examples, the fourth full-duplex pattern may be implemented through the MPTRDL.

The MPTR UL pattern characterizes that data transmission is simultaneously performed over the first hop and the second hop. The first IAB node receives uplink data over the first hop, and sends uplink data over the second hop.

The MPTRDL pattern characterizes that data transmission is simultaneously performed over the first hop and the second hop. That is, the first IAB node sends downlink data over the first hop, and receives downlink data over the second hop.

The frequency domain resource parameter may indicate a frequency domain resource. For example, the frequency domain resource may include a band occupied by the IAB node for data transmission over a specific hop in the frequency domain.

The power control parameter may indicate power control for the first hop and/or power control for the second hop.

The periodicity parameter may indicate a period of resource configuration for the first hop and resource configuration for the second hop.

The multiplexing pattern configuration parameter is a specific configuration parameter in the multiplexing pattern. For example, if the multiplexing pattern is the SDM TX pattern or the SDMRX pattern, the multiplexing pattern configuration parameter may be a specific configuration parameter in the SDM pattern, or the like, which is not limited herein.

In some examples, the multiplexing pattern parameter may be specifically denoted as a number, a letter, a special symbol, a character string, or the like, which is not limited herein. The foregoing multiplexing resource configuration information may be carried in radio resource control (RRC) signaling or F1-AP signaling to be transmitted to the first IAB node or the second IAB node.

The CU may send the multiplexing resource configuration information to a corresponding MT unit in the first IAB node or MT unit in the second IAB node by using the RRC signaling, and then the MT unit in the first IAB node forwards the multiplexing resource configuration information to a DU in the first IAB node, or the MT unit in the second IAB node forwards the multiplexing resource configuration information to a DU in the second IAB node.

The CU may send the multiplexing resource configuration information to the corresponding DU in the first IAB node or DU in the second IAB node by using the F1-AP signaling.

For ease of description, the following uses examples to describe resource configuration of the first IAB node after the first IAB node schedules the first hop and the second IAB node schedules the second hop.

Figure 4:
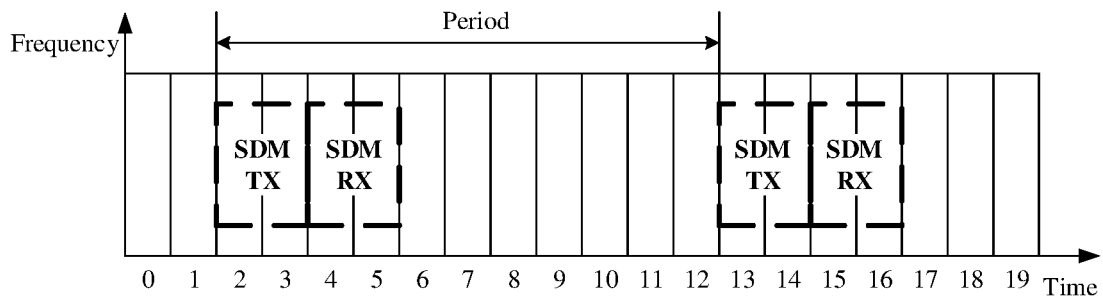
FIG. 4 is a schematic diagram of an example of resource configuration of a first IAB node according to an embodiment of this application.

For example, FIG. 4 is a schematic diagram of an example of resource configuration of a first IAB node according to an embodiment of this application. As shown in FIG. 4, configuration of the first IAB node is an SDM TX pattern in a slot 2 and a slot 3, an SDMRX pattern in a slot 4 and a slot 5, and a period of 11 slots. Correspondingly, in a second period, configuration of the first IAB node is the SDM TX pattern in a slot 13 and a slot 14, and the SDMRX pattern in a slot 15 and a slot 16. By analogy, configuration of the first IAB node in each period is not enumerated herein.

Figure 5:
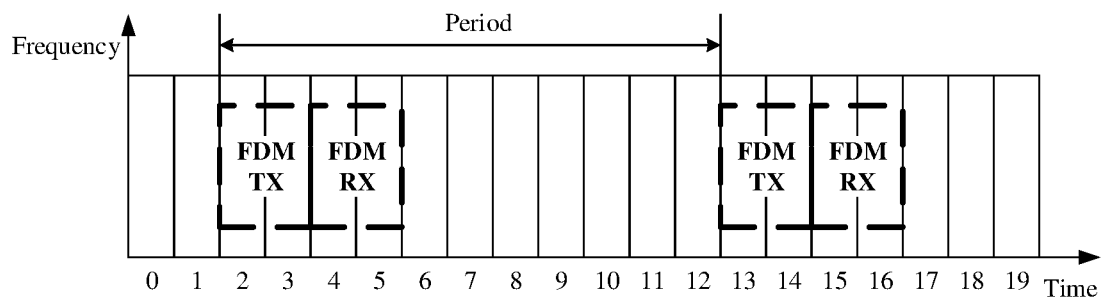
FIG. 5 is a schematic diagram of another example of resource configuration of a first IAB node according to an embodiment of this application.

For another example, FIG. 5 is a schematic diagram of another example of resource configuration of a first IAB node according to an embodiment of this application. As shown in FIG. 5, configuration of the first IAB node is an FDM TX pattern in a slot 2 and a slot 3, an FDMRX pattern in a slot 4 and a slot 5, and a period of 11 slots. Correspondingly, in a second period, configuration of the first IAB node is the FDM TX pattern in a slot 13 and a slot 14, and the FDMRX pattern in a slot 15 and a slot 16. By analogy, configuration of the first IAB node in each period is not enumerated herein.

Figure 6:
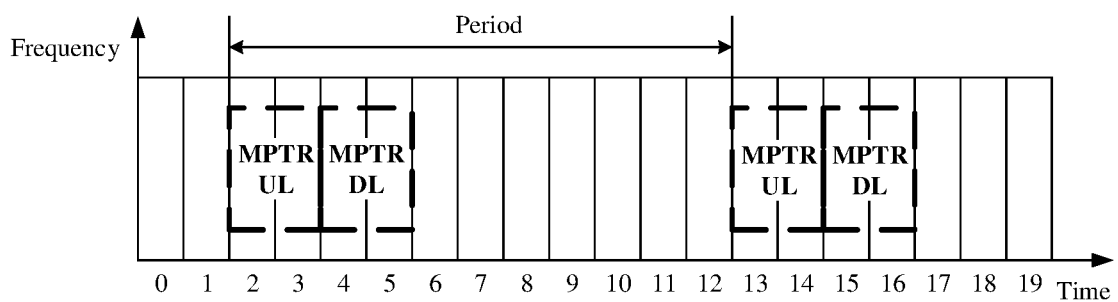
FIG. 6 is a schematic diagram of still another example of resource configuration of a first IAB node according to an embodiment of this application.

For still another example, FIG. 6 is a schematic diagram of still another example of resource configuration of a first IAB node according to an embodiment of this application. As shown in FIG. 6, configuration of the first IAB node is an MPTR UL pattern in a slot 2 and a slot 3, an MPTRDL pattern in a slot 4 and a slot 5, and a period of 11 slots. Correspondingly, in a second period, configuration of the first IAB node is the MPTR UL pattern in a slot 13 and a slot 14, and the MPTRDL pattern in a slot 15 and a slot 16. By analogy, configuration of the first IAB node in each period is not enumerated herein.

Figure 7:
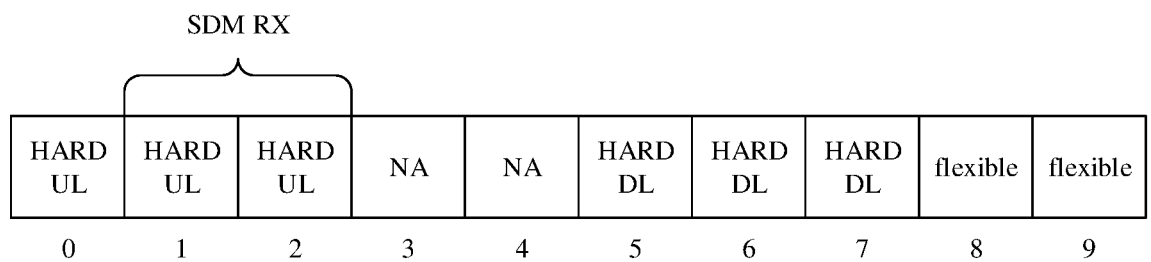
FIG. 7 is a schematic diagram of an example of a resource pattern of a first IAB node during a first hop according to an embodiment of this application.

Further, the multiplexing resource configuration information may also specifically indicate a resource pattern for a hop in one or more specific slots. FIG. 7 is a schematic diagram of an example of a resource pattern of a first IAB node during a first hop according to an embodiment of this application. As shown in FIG. 7, the first hop of the first IAB node has a HARDUL configuration in a slot 0, a slot 1, and a slot 2, a NA configuration in a slot 3 and a slot 4, and a HARD DL configuration in a slot 5, a slot 6, and a slot 7, and a flexible configuration in a slot 8 and a slot 9. Herein, the resource multiplexing pattern in the slot 1 and the slot 2 is the SDM RX pattern.

Herein, the HARDUL configuration refers to an uplink slot or an orthogonal frequency division multiplexing (OFDM) symbol that can be used by a DU at any time. The HARDDL configuration refers to a downlink slot or an OFDM symbol that can be used by the DU at any time. NA refers to a slot or an OFDM symbol that cannot be used by the DU. The flexible configuration refers to a slot or an OFDM symbol that is not used during a previous hop of a first hop and that can be used by the DU.

In some other embodiments, the CU may also send at least part of the multiplexing resource configuration information for the first hop to the second IAB node, so that the second IAB node obtains at least part of a resource configuration state of the first hop. In some examples, the second IAB node determines the multiplexing pattern between the first hop and the second hop based on the at least part of the multiplexing resource configuration information for the first hop and the multiplexing resource configuration information for the second hop.

In some other embodiments, the CU may further send the at least part of the multiplexing resource configuration information for the second hop to the first IAB node, so that the first IAB node obtains at least part of a resource configuration state of the second hop. In some examples, the at least part of the multiplexing resource configuration information for the second hop may be used by the first IAB node for determining the resource multiplexing pattern for the first hop and the second hop based on the at least part of the multiplexing resource configuration information for the second hop and the multiplexing resource configuration information for the first hop.

Figure 8:
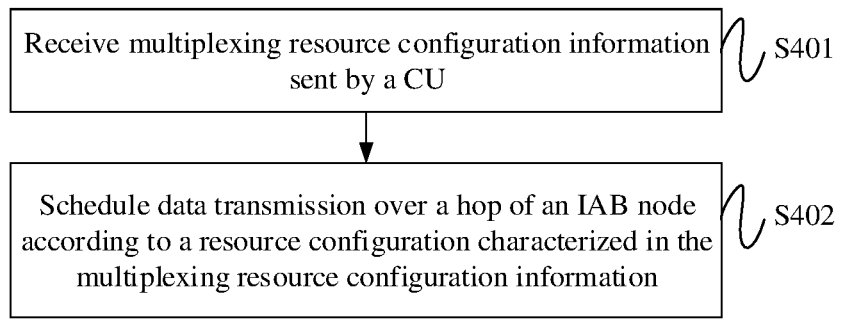
FIG. 8 is a flowchart of an embodiment of a resource configuration method applied to an IAB node according to this application.

An embodiment of this application further provides a resource configuration method, which is applied to the IAB node. The IAB node can communicate with a CU. FIG. 8 is a flowchart of an embodiment of a resource configuration method applied to an IAB node according to this application. As shown in FIG. 8, the resource configuration method may include step S401 and step S402.

Step S401: Receive multiplexing resource configuration information sent by a CU.

The multiplexing resource configuration information is used to indicate a resource configuration for a multiplexing pattern between a hop scheduled by the IAB node and a hop scheduled by another IAB node.

Step S402: Schedule data transmission over the hop of the IAB node according to the resource configuration indicated by the multiplexing resource configuration information.

For data transmission, the multiplexing pattern is used for the hop scheduled by the IAB node and the hop scheduled by the another IAB node, thereby improving spectrum efficiency of the network of the IAB nodes. The another IAB node can also communicate with the CU. The another IAB node is a child IAB node or a parent IAB node of the IAB node.

In a case that the another IAB node is the child IAB node of the IAB node, the IAB node can be viewed as the second IAB node in the foregoing embodiments, and the another IAB node can be viewed as the first IAB node in the foregoing embodiments.

In a case that the another IAB node is the parent IAB node of the IAB node, the IAB node can be viewed as the first IAB node in the foregoing embodiments, and the another IAB node can be viewed as the second IAB node in the foregoing embodiments.

For descriptions of the multiplexing resource configuration information, refer to related content in the foregoing embodiments. Details are not described herein again.

In this embodiment of this application, based on the multiplexing resource configuration information received from the CU, the IAB node may perform resource configuration for the hop scheduled by the IAB node. In addition, for data transmission, the multiplexing pattern is used for the hop scheduled by the IAB node and the hop scheduled by the child IAB node or the parent IAB node of the IAB node, thereby improving spectrum efficiency of the network of the IAB.

In some examples, the foregoing multiplexing resource configuration information may include a time domain resource parameter.

Further, the multiplexing resource configuration information may further include but is not limited to one or more of the following: a frequency domain resource parameter, a multiplexing pattern parameter, a power control parameter, a periodicity parameter, and a multiplexing pattern configuration parameter.

In some examples, the foregoing multiplexing resource configuration information may be carried in RRC signaling or F1-AP signaling. That is, the IAB node may receive the RRC signaling or the F1-AP signaling, and the RRC signaling includes the multiplexing resource configuration information, or the F1-AP signaling includes the multiplexing resource configuration information.

The multiplexing pattern includes one or more of the following: space division multiplexing transmission for the hop scheduled by the IAB node and the hop scheduled by the another IAB node, space division multiplexing reception for the hop scheduled by the IAB node and the hop scheduled by the another IAB node, frequency division multiplexing transmission for the hop scheduled by the IAB node and the hop scheduled by the another IAB node, frequency division multiplexing reception for the hop scheduled by the IAB node and the hop scheduled by the another IAB node, co-frequency co-time multiplexing for uplink reception over the hop scheduled by the IAB node and uplink transmission over the hop scheduled by the another IAB node, co-frequency co-time multiplexing for downlink transmission over the hop scheduled by the IAB node and downlink reception over the hop scheduled by the another IAB node, inter-frequency co-time multiplexing for uplink reception over the hop scheduled by the IAB node and uplink transmission over the hop scheduled by the another IAB node, and inter-frequency co-time multiplexing for downlink transmission over the hop scheduled by the IAB node and downlink reception over the hop scheduled by the another IAB node.

For descriptions of the time domain resource parameter, the frequency domain resource parameter, the power control parameter, the multiplexing pattern parameter, the periodicity parameter, the multiplexing pattern configuration parameter, the RRC signaling, and the F1-AP signaling, refer to related content in the foregoing embodiments. Details are not described herein again.

In some other embodiments, the IAB node may also receive at least part of the multiplexing resource configuration information of another IAB node that is sent by the CU, to obtain a resource configuration state of the hop scheduled by the another IAB node. Further, the IAB node may also obtain the multiplexing pattern of the hop scheduled by the another IAB node based on the multiplexing resource configuration information of the IAB node and the multiplexing resource configuration information of the another IAB node.

Specifically, the multiplexing resource configuration information of the IAB node may indicate the resource configuration for the hop scheduled by the IAB node, and the multiplexing resource configuration information of the another IAB node may indicate the resource configuration for the hop scheduled by the another IAB node. The resource configuration for the hop scheduled by the IAB node is compared with the resource configuration for the hop scheduled by the another IAB node, thereby determining the resource multiplexing pattern for the hop scheduled by the another IAB node.

For example, the FIG. 9 is a schematic diagram of an example of a resource pattern for a hop according to an embodiment of this application. In this example, an IAB node is a child IAB node of another IAB node. That is, the IAB node may be viewed as the first IAB node in the foregoing embodiments, and the another IAB node may be viewed as the second IAB node in the foregoing embodiments. Correspondingly, the IAB node schedules a first hop, and the another IAB node schedules a second hop. A resource configuration for each of the first hop and the second hop is shown in FIG. 9. The first hop has a HARDUL configuration in a slot 0, the HARDUL configuration in a slot 1, a HARD DL configuration in a slot 6, and the HARD DL configuration in a slot 7. The second hop has the HARDUL configuration in a slot 0, the HARDDL configuration in a slot 1, the HARDUL configuration in a slot 6, and the HARD DL configuration in a slot 7.

If the IAB node receives multiplexing resource configuration information of the another IAB node sent by a CU, the IAB node obtains the resource configuration for the second hop scheduled by the another IAB node. In the slot 0, the resource configuration for the first hop is the HARDUL configuration, the resource configuration for the second hop is the HARDUL configuration, and the resource multiplexing pattern for the first hop and the second hop may be determined as the MPTR UL pattern. In the slot 1, the resource configuration for the first hop is the HARDUL configuration, the resource configuration for the second hop is the HARDDL configuration, and the resource multiplexing pattern for the first hop and the second hop may be determined as the SDM RX pattern. In the slot 6, the resource configuration for the first hop is the HARDDL configuration, the resource configuration for the second hop is the HARDUL configuration, and the resource multiplexing pattern for the first hop and the second hop may be determined as the SDM TX pattern. In the slot 7, the resource configuration for the first hop is the HARDDL configuration, the resource configuration for the second hop is the HARDDL configuration, and the resource multiplexing pattern for the first hop and the second hop may be determined as the MPTR DL pattern.

An embodiment of this application further provides a resource configuration apparatus. The resource configuration apparatus communicates with a first IAB node and a second IAB node. The first IAB node and the second IAB node schedule data transmission over the first hop and the second hop of the first IAB node, respectively. Specifically, the resource configuration apparatus may be implemented as the CU in the foregoing embodiments. FIG. 10 is a schematic structural diagram of an embodiment of a resource configuration apparatus according to this application. As shown in FIG. 10, a resource configuration apparatus 500 may include a multiplexing pattern determining module 501 and a sending module 502.

The multiplexing pattern determining module 501 is configured to determine a multiplexing pattern between the first hop and the second hop.

The sending module 502 is configured to send multiplexing resource configuration information for the first hop and/or the second hop.

The multiplexing resource configuration information is used to indicate a resource configuration for the multiplexing pattern.

In this embodiment of this application, the resource configuration apparatus determines the multiplexing pattern for the first hop and the second hop of the first IAB node, and sends the multiplexing resource configuration information for the first hop and/or the second hop. Herein, the multiplexing resource configuration information may indicate a resource configuration for the multiplexing pattern. The sent multiplexing resource configuration information for the first hop and/or the second hop may enable the first IAB node to schedule data transmission over the first hop based on the multiplexing resource configuration information for the first hop, and/or enable the second IAB node to schedule data transmission over the second hop based on the multiplexing resource configuration information for the second hop. Data transmission over the first hop and the second hop is performed in the multiplexing pattern, thereby improving spectrum efficiency of the network of the IAB nodes.

In some examples, the sending module 502 is configured to: send the multiplexing resource configuration information for the first hop to the first IAB node, and/or send the multiplexing resource configuration information for the second hop to the second IAB node.

In some examples, the sending module 502 is further configured to send at least part of the multiplexing resource configuration information for the first hop to the second IAB node. Herein, the second IAB node determines the multiplexing pattern between the first hop and the second hop based on the at least part of the multiplexing resource configuration information for the first hop and the multiplexing resource configuration information for the second hop.

In some other examples, the sending module 502 is further configured to send at least part of the multiplexing resource configuration information for the second hop to the first IAB node. The at least part of the multiplexing resource configuration information for the second hop may be used by the first IAB node for determining the multiplexing pattern between the first hop and the second hop based on the at least part of the multiplexing resource configuration information for the second hop and the multiplexing resource configuration information for the first hop.

Specifically, the multiplexing resource configuration information in the foregoing embodiments includes a time domain resource parameter.

Further, the multiplexing resource configuration information further includes one or more of the following: a frequency domain resource parameter, a multiplexing pattern parameter, a power control parameter, a periodicity parameter, and a multiplexing pattern configuration parameter.

Specifically, the multiplexing pattern includes one or more of the following: space division multiplexing transmission for the first hop and the second hop, space division multiplexing reception for the first hop and the second hop, frequency division multiplexing transmission for the first hop and the second hop, frequency division multiplexing reception for the first hop and the second hop, co-frequency co-time multiplexing for uplink reception over the first hop and uplink transmission over the second hop, co-frequency co-time multiplexing for downlink transmission over the first hop and downlink reception over the second hop, inter-frequency co-time multiplexing for uplink reception over the first hop and uplink transmission over the second hop, and inter-frequency co-time multiplexing for downlink transmission over the first hop and downlink reception over the second hop.

In some examples, the multiplexing resource configuration information is carried in RRC signaling or F1-AP signaling.

Specifically, the first IAB node in the foregoing embodiments is a child IAB node of the second IAB node.

An embodiment of this application further provides a resource configuration apparatus. The resource configuration apparatus may communicate with a CU. Specifically, the resource configuration apparatus may be implemented as the IAB node in the foregoing embodiments. FIG. 11 is a schematic structural diagram of an embodiment of a resource configuration apparatus according to this application. As shown in FIG. 11, a resource configuration apparatus 600 may include a receiving module 601 and a scheduling module 602.

The receiving module 601 is configured to receive multiplexing resource configuration information sent by the CU.

Herein, the multiplexing resource configuration information is used to indicate a resource configuration for a multiplexing pattern between a hop scheduled by the resource configuration apparatus and a hop scheduled by another resource configuration apparatus.

The scheduling module 602 is configured to schedule data transmission over the hop according to the resource configuration indicated by the multiplexing resource configuration information.

The resource configuration apparatus is a child resource configuration apparatus or a parent resource configuration apparatus of the another resource configuration apparatus.

In this embodiment of this application, based on the multiplexing resource configuration information received from the CU, the resource configuration apparatus may perform resource configuration for the hop scheduled by the resource configuration apparatus. In addition, for data transmission, the multiplexing pattern is used for the hop scheduled by the resource configuration apparatus and the hop scheduled by the child resource configuration apparatus or the parent resource configuration apparatus of the resource configuration apparatus, thereby improving spectrum efficiency of the network of the IAB.

In some examples, the receiving module is further configured to: receive at least part of the multiplexing resource configuration information that is sent by the CU and that is for the hop scheduled by the another resource configuration apparatus; and obtain, based on the multiplexing resource configuration information for the hop scheduled by the resource configuration apparatus and the at least part of the multiplexing resource configuration information for the hop scheduled by the another resource configuration apparatus, the multiplexing pattern for the hop scheduled by the another resource configuration apparatus.

Specifically, the multiplexing resource configuration information includes a time domain resource parameter.

Further, the multiplexing resource configuration information further includes one or more of the following: a frequency domain resource parameter, a multiplexing pattern parameter, a power control parameter, a periodicity parameter, and a multiplexing pattern configuration parameter.

Specifically, the multiplexing pattern includes one or more of the following: space division multiplexing transmission for the hop scheduled by the resource configuration apparatus and the hop scheduled by the another resource configuration apparatus, space division multiplexing reception for the hop scheduled by the resource configuration apparatus and the hop scheduled by the another resource configuration apparatus, frequency division multiplexing transmission for the hop scheduled by the resource configuration apparatus and the hop scheduled by the another resource configuration apparatus, frequency division multiplexing reception for the hop scheduled by the resource configuration apparatus and the hop scheduled by the another resource configuration apparatus, co-frequency co-time multiplexing for uplink reception over the hop scheduled by the resource configuration apparatus and uplink transmission over the hop scheduled by the another resource configuration apparatus, co-frequency co-time multiplexing for downlink transmission over the hop scheduled by the resource configuration apparatus and downlink reception over the hop scheduled by the another resource configuration apparatus, inter-frequency co-time multiplexing for uplink reception over the hop scheduled by the resource configuration apparatus and uplink transmission over the hop scheduled by the another resource configuration apparatus, and inter-frequency co-time multiplexing for downlink transmission over the hop scheduled by the resource configuration apparatus and downlink reception over the hop scheduled by the another resource configuration apparatus.

In some examples, the multiplexing resource configuration information is carried in the radio resource control RRC signaling or the F1-AP signaling.

Figure 12:
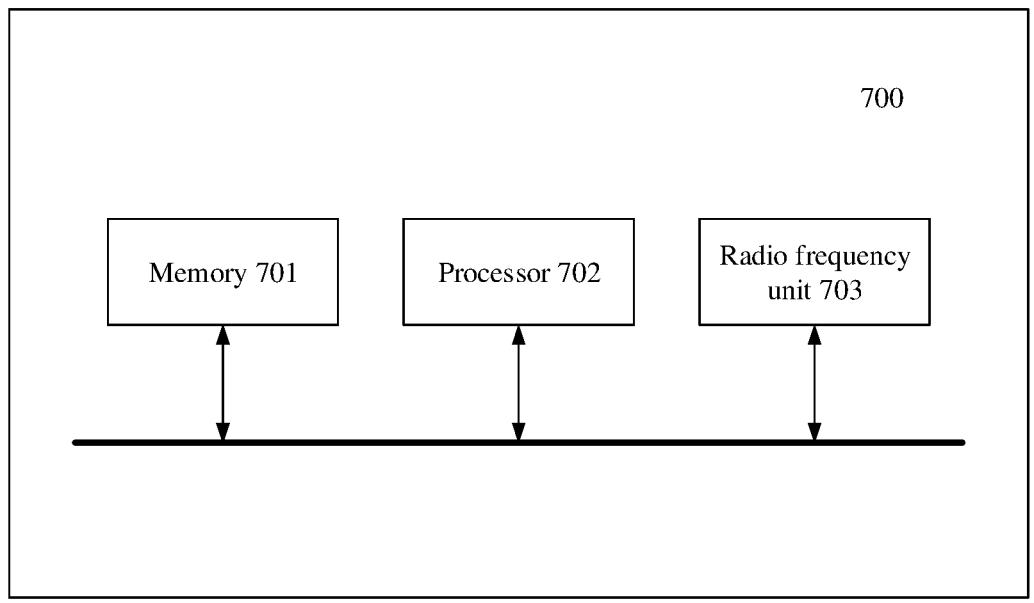
FIG. 12 is a schematic diagram of a hardware structure of an embodiment of a resource configuration device according to this application.

FIG. 12 a schematic diagram of a hardware structure of an embodiment of a resource configuration device according to this application. The resource configuration device may be viewed as the CU in the foregoing embodiment, and may be specifically implemented as a base station. As shown in FIG. 12, a resource configuration device 700 includes a memory 701, a processor 702, a radio frequency unit 703, and a computer program stored in the memory 701 and capable of running on the processor 702. A person skilled in the art may understand that the resource configuration device is not limited to a structure of the resource configuration device shown in FIG. 12. The resource configuration device may include more or fewer components than those shown in the figure, or some components may be combined, or there may be a different component layout.

The processor 702 is configured to determine a multiplexing pattern between the first hop and the second hop.

The radio frequency unit 703 is configured to send multiplexing resource configuration information for the first hop and/or the second hop. The multiplexing resource configuration information is used to indicate a resource configuration for the multiplexing pattern.

In FIG. 12, the bus architecture may include any quantity of interconnected buses and bridges, and specifically connects together various circuits of one or more processors represented by the processor 702 and a memory represented by the memory 701. The bus architecture may further interconnect various other circuits such as a peripheral device, a voltage regulator, and a power management circuit, which are all well known in the art. Therefore, details are not further described in this specification. The bus interface provides an interface. The radio frequency unit 703 may be a plurality of elements, including a transmitter and a transceiver and provides units that are configured to: communicate with various other apparatuses over a transmission medium, and receive and send data under control of the processor 702. The processor 702 is responsible for management of the bus architecture and general processing, and the memory 701 may store data used by the processor 702 when the processor 702 performs an operation.

In some embodiments, the resource configuration device may include a processor 702, a memory 701, and a computer program stored in the memory 701 and capable of running on the processor 702. When the computer program is executed by the processor 702, processes of embodiments of the foregoing resource configuration method applied to the CU shown in FIG. 3 are implemented, with a same technical effect achieved. To avoid repetition, details are not described herein again.

Figure 13:
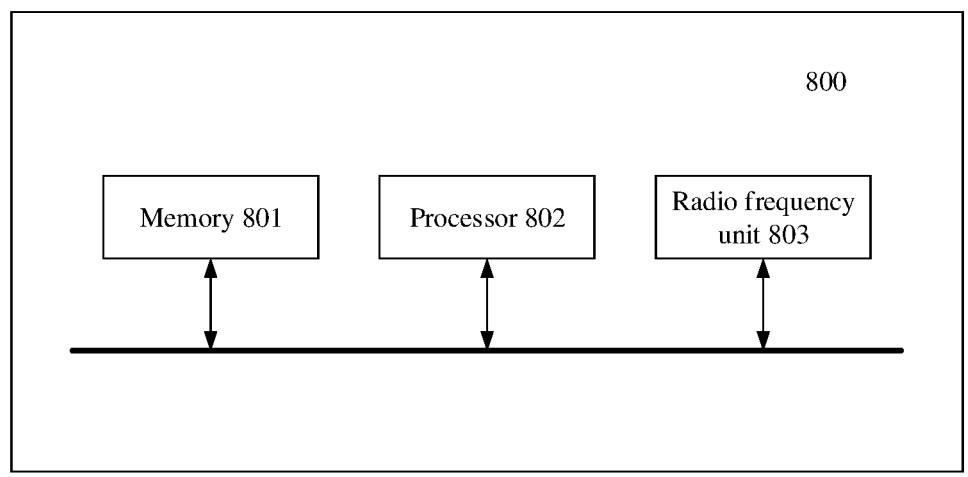
FIG. 13 a schematic diagram of a hardware structure of an embodiment of a resource configuration device according to this application.

FIG. 13 a schematic diagram of a hardware structure of an embodiment of a resource configuration device according to this application. The resource configuration device may be viewed as the IAB node in the foregoing embodiment, and may be specifically implemented as a base station. As shown in FIG. 13, the resource configuration device 800 includes a memory 801, a processor 802, a radio frequency unit 803, and a computer program stored in the memory 801 and capable of running on the processor 802. A person skilled in the art may understand that the resource configuration device is not limited to a structure of the resource configuration device shown in FIG. 13. The resource configuration device may include more or fewer components than those shown in the figure, or combine some of the components, or arrange the components differently.

The radio frequency unit 803 is configured to receive multiplexing resource configuration information sent by the CU. Herein, the multiplexing resource configuration information is used to indicate a resource configuration for a multiplexing pattern between a hop scheduled by the resource configuration device and a hop scheduled by another resource configuration device. The resource configuration device is a child resource configuration device or a parent resource configuration device of the another resource configuration device.

The processor 802 is configured to schedule data transmission over the hop of the resource configuration device according to the resource configuration indicated by the multiplexing resource configuration information.

In FIG. 13, the bus architecture may include any quantity of interconnected buses and bridges, and specifically connects together various circuits of one or more processors represented by the processor 802 and a memory represented by the memory 801. The bus architecture may further interconnect various other circuits such as a peripheral device, a voltage regulator, and a power management circuit, which are all well known in the art. Therefore, details are not further described in this specification. The bus interface provides an interface. The radio frequency unit 803 may be a plurality of elements, including a transmitter and a transceiver and provides units that are configured to: communicate with various other apparatuses over a transmission medium, and receive and send data under control of the processor 802. The processor 802 is responsible for management of the bus architecture and general processing, and the memory 801 may store data used by the processor 802 when the processor 802 performs an operation.

In some embodiments, the resource configuration device may include a processor 802, a memory 801, and a computer program stored in the memory 801 and capable of running on the processor 802. When the computer program is executed by the processor 802, processes of embodiments of the foregoing resource configuration method applied to the IAB node shown in FIG. 8 are implemented, with a same technical effect achieved. To avoid repetition, details are not described herein again.

Embodiments of this application further provide a computer-readable storage medium, where a computer program is stored in the computer-readable storage medium. When the computer program is executed by a processor, the processes in the embodiments of the resource configuration method applied to the CU or the processes in the embodiments of the resource configuration method applied to the IAB node are implemented, with the same technical effects achieved. To avoid repetition, details are not described herein again. For example, the computer-readable storage medium is a read-only memory (ROM for short), a random access memory (RAM for short), a magnetic disk, an optical disc, or the like.

The resource configuration method, apparatus, and device, and the storage medium in the foregoing embodiments may be applied to a 5G communications system and a future communications system, which is not limited herein.

The embodiments in this specification are all described in a progressive manner. For same or similar parts in the embodiments, mutual reference may be made. Each embodiment focuses what is different from other embodiments. For related content of the embodiments of the CU, the IAB node, the base station, and the computer-readable storage medium, refer to descriptions of the method embodiments.

It should be noted that in this specification, the term "comprise", "include", or any other variant thereof is intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the description of the foregoing implementations, a person skilled in the art can clearly understand that the method in the foregoing embodiments may be implemented by software in addition to a necessary universal hardware platform or by hardware only. In most cases, the former is an implementation. Based on such an understanding, the technical solutions of this application essentially, or the part contributing to the prior art may be implemented in a form of a software product. The software product is stored in a storage medium (for example, ROM/RAM, a magnetic disk, or an optical disc), and includes several instructions for instructing a terminal (which may be a mobile phone, a computer, a server, an air conditioner, a network device, or the like) to perform the method described in the embodiments of this application.

The aspects of this application are described with reference to the flowcharts and/or block diagrams of the method, the apparatus (system), and the computer program product according to the embodiments of this application. It should be understood that each block in the flowcharts and/or the block diagrams, and a combination of blocks in the flowcharts and/or the block diagrams may be implemented through the program or the instruction. These programs or instructions may be provided for a general-purpose computer, a dedicated computer, or a processor of other programmable data processing apparatuses to generate a machine, so that these programs or instructions executed by the computer or the processor of the other programmable data processing apparatuses can implement a specified function/motion in one or more blocks in the flowcharts and/or the block diagrams. Such processor may be, but is not limited to, a general-purpose processor, a dedicated processor, an application-specific processor, or a field programmable logic circuit. It should be further understood that each block in the block diagrams and/or flowcharts, and a combination of blocks in the block diagrams and/or flowcharts can also be implemented by dedicated hardware that performs a specified function or motion, or can be implemented by a combination of the dedicated hardware and computer instructions.

The embodiments of this application are described above with reference to the accompanying drawings, but this application is not limited to the foregoing embodiments. The foregoing embodiments are only illustrative rather than restrictive. Inspired by this application, persons of ordinary skill in the art can still derive many variations without departing from the essence of this application and the protection scope of the claims. All these variations shall fall within the protection of this application.

What is claimed is:

1. A resource configuration method, applied to a centralized unit (CU), wherein the CU communicates with a first integrated access backhaul (IAB) node and a second IAB node, the first IAB node and the second IAB node schedule data transmission over a first hop and a second hop of the first IAB node, respectively, and the method comprises:
   determining a multiplexing pattern between the first hop and the second hop; and
   sending multiplexing resource configuration information for the first hop and/or the second hop, wherein the multiplexing resource configuration information is used to indicate a resource configuration for the multiplexing pattern;
   wherein the first hop is a hop between the first IAB node and the downstream node of the first IAB node, and the first IAB node schedules data transmission over the first hop; the second hop is a hop between the first IAB node and the second IAB node, and the second IAB node schedules data transmission over the second hop;
   wherein the method further comprises: sending at least part of the multiplexing resource configuration information for the first hop to the second IAB node, and/or sending at least part of the multiplexing resource configuration information for the second hop to the first IAB node.

2. The method according to claim 1, wherein the sending multiplexing resource configuration information for the first hop and/or the second hop comprises:
   sending the multiplexing resource configuration information for the first hop to the first IAB node, and/or sending the multiplexing resource configuration information for the second hop to the second IAB node.

3. The method according to claim 1, wherein the second IAB node determines the multiplexing pattern between the first hop and the second hop based on the at least part of the multiplexing resource configuration information for the first hop and the multiplexing resource configuration information for the second hop; or
   the at least part of the multiplexing resource configuration information for the second hop is used by the first IAB node for determining the multiplexing pattern between the first hop and the second hop based on the at least part of the multiplexing resource configuration information for the second hop and the multiplexing resource configuration information for the first hop.

4. The method according to claim 1, wherein the multiplexing resource configuration information comprises a time domain resource parameter.

5. The method according to claim 4, wherein the multiplexing resource configuration information further comprises one or more of the following:
   a frequency domain resource parameter, a multiplexing pattern parameter, a power control parameter, a periodicity parameter, and a multiplexing pattern configuration parameter.

6. The method according to claim 1, wherein the multiplexing pattern comprises one or more of the following:
   space division multiplexing transmission for the first hop and the second hop, space division multiplexing reception for the first hop and the second hop, frequency division multiplexing transmission for the first hop and the second hop, frequency division multiplexing reception for the first hop and the second hop, co-frequency co-time multiplexing for uplink reception over the first hop and uplink transmission over the second hop, co-frequency co-time multiplexing for downlink transmission over the first hop and downlink reception over the second hop, inter-frequency co-time multiplexing for uplink reception over the first hop and uplink transmission over the second hop, and inter-frequency co-time multiplexing for downlink transmission over the first hop and downlink reception over the second hop.

7. The method according to claim 1, wherein the multiplexing resource configuration information is carried in radio resource control RRC signaling or F1-AP signaling.

8. The method according to claim 1, wherein the first IAB node is a child IAB node of the second IAB node.

9. A resource configuration device, comprising a processor, a memory, and a program stored in the memory and capable of running on the processor, wherein the resource configuration device communicates with a first integrated access backhaul (IAB) node and a second IAB node, the first IAB node and the second IAB node schedule data transmission over a first hop and a second hop of the first IAB node, respectively, wherein when the program is executed by the processor, the processor is configured to:
   determine a multiplexing pattern between the first hop and the second hop; and
   send multiplexing resource configuration information for the first hop and/or the second hop, wherein the multiplexing resource configuration information is used to indicate a resource configuration for the multiplexing pattern;
   wherein the first hop is a hop between the first IAB node and the downstream node of the first IAB node, and the first IAB node schedules data transmission over the first hop; the second hop is a hop between the first IAB node and the second IAB node, and the second IAB node schedules data transmission over the second hop;

wherein the processor is further configured to, send at least part of the multiplexing resource configuration information for the first hop to the second IAB node, and/or send at least part of the multiplexing resource configuration information for the second hop to the first IAB node.

10. The resource configuration device according to claim 9, wherein the processor is further configured to:
send the multiplexing resource configuration information for the first hop to the first IAB node, and/or send the multiplexing resource configuration information for the second hop to the second IAB node.

11. The resource configuration device according to claim 9, wherein
the second IAB node determines the multiplexing pattern between the first hop and the second hop based on the at least part of the multiplexing resource configuration information for the first hop and the multiplexing resource configuration information for the second hop; or
the at least part of the multiplexing resource configuration information for the second hop is used by the first IAB node for determining the multiplexing pattern between the first hop and the second hop based on the at least part of the multiplexing resource configuration information for the second hop and the multiplexing resource configuration information for the first hop.

12. The resource configuration device according to claim 9, wherein the multiplexing resource configuration information comprises a time domain resource parameter.

13. The resource configuration device according to claim 12, wherein the multiplexing resource configuration information further comprises one or more of the following:
a frequency domain resource parameter, a multiplexing pattern parameter, a power control parameter, a periodicity parameter, and a multiplexing pattern configuration parameter.

14. A non-transitory computer-readable storage medium, at a centralized unit (CU), wherein the CU communicates with a first integrated access backhaul (IAB) node and a second IAB node, the first IAB node and the second IAB node schedule data transmission over a first hop and a second hop of the first IAB node, respectively, and the non-transitory computer-readable storage medium stores a computer program, and when the computer program is executed by a processor, the following steps are performed:
determining a multiplexing pattern between the first hop and the second hop; and
sending multiplexing resource configuration information for the first hop and/or the second hop, wherein the multiplexing resource configuration information is used to indicate a resource configuration for the multiplexing pattern;
wherein the first hop is a hop between the first IAB node and the downstream node of the first IAB node, and the first IAB node schedules data transmission over the first hop; the second hop is a hop between the first IAB node and the second IAB node, and the second IAB node schedules data transmission over the second hop;
wherein the method further comprises: sending at least part of the multiplexing resource configuration information for the first hop to the second IAB node, and/or sending at least part of the multiplexing resource configuration information for the second hop to the first IAB node.

15. The non-transitory computer-readable storage medium according to claim 14, wherein the sending multiplexing resource configuration information for the first hop and/or the second hop comprises:
sending the multiplexing resource configuration information for the first hop to the first IAB node, and/or sending the multiplexing resource configuration information for the second hop to the second IAB node.

16. The non-transitory computer-readable storage medium according to claim 14, wherein the second IAB node determines the multiplexing pattern between the first hop and the second hop based on the at least part of the multiplexing resource configuration information for the first hop and the multiplexing resource configuration information for the second hop; or
the at least part of the multiplexing resource configuration information for the second hop is used by the first IAB node for determining the multiplexing pattern between the first hop and the second hop based on the at least part of the multiplexing resource configuration information for the second hop and the multiplexing resource configuration information for the first hop.

17. The non-transitory computer-readable storage medium according to claim 14, wherein the multiplexing resource configuration information comprises a time domain resource parameter.

18. The non-transitory computer-readable storage medium according to claim 17, wherein the multiplexing resource configuration information further comprises one or more of the following:
a frequency domain resource parameter, a multiplexing pattern parameter, a power control parameter, a periodicity parameter, and a multiplexing pattern configuration parameter.

19. The non-transitory computer-readable storage medium according to claim 14, wherein the multiplexing pattern comprises one or more of the following:
space division multiplexing transmission for the first hop and the second hop, space division multiplexing reception for the first hop and the second hop, frequency division multiplexing transmission for the first hop and the second hop, frequency division multiplexing reception for the first hop and the second hop, co-frequency co-time multiplexing for uplink reception over the first hop and uplink transmission over the second hop, co-frequency co-time multiplexing for downlink transmission over the first hop and downlink reception over the second hop, inter-frequency co time multiplexing for uplink reception over the first hop and uplink transmission over the second hop, and inter-frequency co-time multiplexing for downlink transmission over the first hop and downlink reception over the second hop.

20. The non-transitory computer-readable storage medium according to claim 14, wherein the multiplexing resource configuration information is carried in radio resource control RRC signaling or F1 AP signaling.

* * * * *